US007915575B2

(12) United States Patent
Yokoi

(10) Patent No.: US 7,915,575 B2
(45) Date of Patent: Mar. 29, 2011

(54) LASER SCANNING MICROSCOPE HAVING AN IR PARTIAL TRANSMISSION FILTER FOR REALIZING OBLIQUE ILLUMINATION

(75) Inventor: Eiji Yokoi, Tokyo (JP)

(73) Assignee: Olympus Corporation, Tokyo (JP)

( * ) Notice: Subject to any disclaimer, the term of this patent is extended or adjusted under 35 U.S.C. 154(b) by 55 days.

(21) Appl. No.: 12/250,680

(22) Filed: Oct. 14, 2008

(65) Prior Publication Data

US 2009/0108187 A1 Apr. 30, 2009

(30) Foreign Application Priority Data

Oct. 31, 2007 (JP) ................................. 2007-282653

(51) Int. Cl.
*H01J 40/14* (2006.01)
*H01L 25/00* (2006.01)
(52) U.S. Cl. .......................... 250/226; 250/216; 250/332
(58) Field of Classification Search .................. 250/226, 250/201.3, 216, 208.1, 234, 330, 332, 338.1, 250/339.01, 339.02, 339.06; 359/368, 385, 359/391
See application file for complete search history.

(56) References Cited

U.S. PATENT DOCUMENTS

| 5,583,342 | A | 12/1996 | Ichie |
| 5,796,112 | A | 8/1998 | Ichie |
| 6,169,289 | B1* | 1/2001 | White et al. ............... 250/458.1 |
| 6,396,628 | B1 | 5/2002 | Osa et al. |
| 6,643,061 | B2 | 11/2003 | Osa et al. |
| 2008/0059135 | A1* | 3/2008 | Murugkar et al. ............... 703/11 |
| 2008/0304047 | A1* | 12/2008 | Lee et al. ......................... 356/51 |
| 2008/0308730 | A1* | 12/2008 | Vizi et al. ...................... 250/309 |

FOREIGN PATENT DOCUMENTS

| JP | 11-133308 A | 5/1999 |
| JP | 2931268 B2 | 5/1999 |

* cited by examiner

*Primary Examiner* — Que T Le
*Assistant Examiner* — Pascal M Bui-Pho
(74) *Attorney, Agent, or Firm* — Holtz, Holtz, Goodman & Chick, PC

(57) ABSTRACT

In a laser scanning microscope comprising an infrared pulse laser; an objective lens focusing an infrared light from the infrared pulse laser on a sample; a condenser lens disposed on an opposite side of the objective lens across the sample for collecting an observation light that is generated by a nonlinear optical effect and has a wavelength shorter than a wavelength of the infrared light; a visible light detector detecting the observation light collected by the condenser lens, an IR partial transmission filter having partially-modified transmission characteristics for the infrared light is disposed near a front focal position of the condenser lens, and an infrared light detector detecting, through the IR partial transmission filter, a transmitted light from the sample collected by the condenser lens, is provided.

8 Claims, 3 Drawing Sheets

LASER SCANNING MICROSCOPE HAVING AN IR PARTIAL TRANSMISSION FILTER FOR REALIZING OBLIQUE ILLUMINATION

CROSS REFERENCE TO RELATED APPLICATIONS

This application claims benefit of Japanese Application No. 2007-282653, filed Oct. 31, 2007, the contents of which are incorporated by this reference.

BACKGROUND OF THE INVENTION

1. Field of the Invention

The present invention relates to the technical field of microscopes.

2. Description of the Related Art

A fluorescence observation method using multiphoton excitation has been known as a method of fluorescence observation with a microscope.

With the multiphoton excitation, a fluorescent material is irradiated with light beams having a wavelength corresponding approximately to the integral multiple of the absorption wavelength simultaneously, inducing an excitation phenomenon that is equivalent to the excitation phenomenon generated by the original absorption wavelength. The multiphoton excitation phenomenon is called a nonlinear phenomenon, which occurs with a rate proportional to the square of the intensity of the excitation light in the case of, for example, two-photon excitation.

Meanwhile, the light density of an excitation light focused by an objective lens of a microscope decreases in inverse proportion to the square of the distance from the focal plane. In other words, the multiphoton excitation phenomenon in a microscope occurs only in the area very close to the focal point, and the fluorescence is emitted only from that area.

Thanks to the above characteristics of the multiphoton excitation, a multiphoton-excitation laser scanning microscope does not require a confocal pinhole on the detection side that is used in a normal confocal microscope for shutting out the emission of fluorescence in areas other than the focal plane. The multiphoton excitation also has an advantage that the discoloration by the fluorescence in a sample can be suppressed, since the excitation phenomenon occurs only on the focal plane.

Meanwhile, since the excitation light used for the multiphoton excitation has a longer wavelength than usual, it generally becomes a light beam in the infrared domain. Generally, a light with a longer wavelength is less prone to scatter (Rayleigh scatter). Therefore, the excitation light used in the multiphoton excitation has a characteristic that it reaches deeper in a specimen having a scattering property, such as a living specimen. This means that the use of multiphoton excitation enables the observation into a deep area in a living body that could not be attained with a normal visible light.

Thus, the fluorescence observation utilizing the multiphoton excitation in a microscope has now become very effective.

Similarly, in a microscope utilizing a Second-Harmonic Generation (SHG), a light having a half wavelength of the irradiation light is detected. Therefore, an SHG microscope also has advantages such as less influence from the Rayleigh scatter and less light invasion caused by the light to the sample.

The observation of a specimen using the above-described microscopes often involves a preparation of the specimen in advance, using another observation method. Particularly, when observing a specimen using the patch-clamp method, an electrode needs to be disposed accurately on a specific position in the specimen. Conventionally, in such a case, the multiphoton-excitation observation and SHG observation have been carried out, after attaching a patch clamp using observation methods utilizing differential interference contrast (DIC) or oblique illumination.

However, the preparation of a specimen using the DIC and oblique illumination has a significant problem.

The DIC observation requires a Nomarski prism or a Wollaston prism to be disposed on the image side of the objective lens. However, the laser entering the objective lens is to produce spots while it is spilt by the prism into two light fluxes that are slightly shifted sideways on the sample position, causing the degradation of resolution and decrease in brightness. For this reason, with the observation using the laser, these prisms need to be removed from the light path, and they need to be inserted into the path, with the DIC observation using a transmitted illumination light. However, when carrying out observation using the patch-clamp method, there have been problems such as the slight shake generated by these operations causing the detachment of the electrode.

In addition, transmitted-light DIC using the laser requires a linearly-polarized light with a high extinction ratio. However, the extinction ratio of the laser itself is low, and the optical system on the way to the objective lens breaks its polarization. Therefore, the light needs to be transmitted through a polarizer. Meanwhile, in the nonlinear microscopy observation method, the excitation efficiency is proportional to an n-th power of the laser intensity. Therefore, the loss of light intensity due to the polarizer causes decreases in the detection sensitivity and in the depth limitation in deep observation of a scattering substance.

Meanwhile, the contrast method using oblique illumination involves the oblique illumination of a transmitted-illumination light, the angle being provided by disposing a slit on a front focal position of the condenser lens. For this reason, the slit needs to be removed from the optical path, when performing the multiphoton-excitation observation or the SHG observation. This also leads to problems such as the slight shake generated by the insertion and removal of the slit causing the detachment of the electrode.

SUMMARY OF THE INVENTION

An embodiment of the present invention is a laser scanning microscope comprising an infrared pulse laser; an objective lens focusing an infrared light from the infrared pulse laser on a sample; a condenser lens disposed on an opposite side of the objective lens across the sample for collecting an observation light that is generated by a nonlinear optical effect and has a wavelength shorter than a wavelength of the infrared light; a visible light detector detecting the observation light collected by the condenser lens, in which an IR partial transmission filter having partially-modified transmission characteristics with respect to the infrared light is disposed near a front focal position of the condenser lens, and an infrared light detector detecting, through the IR partial transmission filter, a transmitted light from the sample collected by the condenser lens, is provided.

Another embodiment of the present invention is a laser scanning microscope comprising an infrared pulse laser; an objective lens focusing an infrared light from the infrared pulse laser on a sample; a condenser lens disposed on an opposite side of the objective lens across the sample for collecting an observation light that is generated by a nonlinear optical effect and has a wavelength shorter than a wavelength of the infrared light; a visible light detector detecting the observation light collected by the condenser lens, in which an IR partial transmission filter having partially-modified transmission characteristics with respect to the infrared light is disposed near a front focal position of the condenser lens, and an infrared light source illuminating the sample through the condenser lens and the IR partial transmission filter, and an infrared light detector detecting a transmitted light from the sample collected by the objective lens are disposed.

BRIEF DESCRIPTION OF THE DRAWINGS

The present invention will be more apparent from the following detailed description when the accompanying drawings are referenced.

DESCRIPTION OF THE PREFERRED EMBODIMENTS

Figure 1:
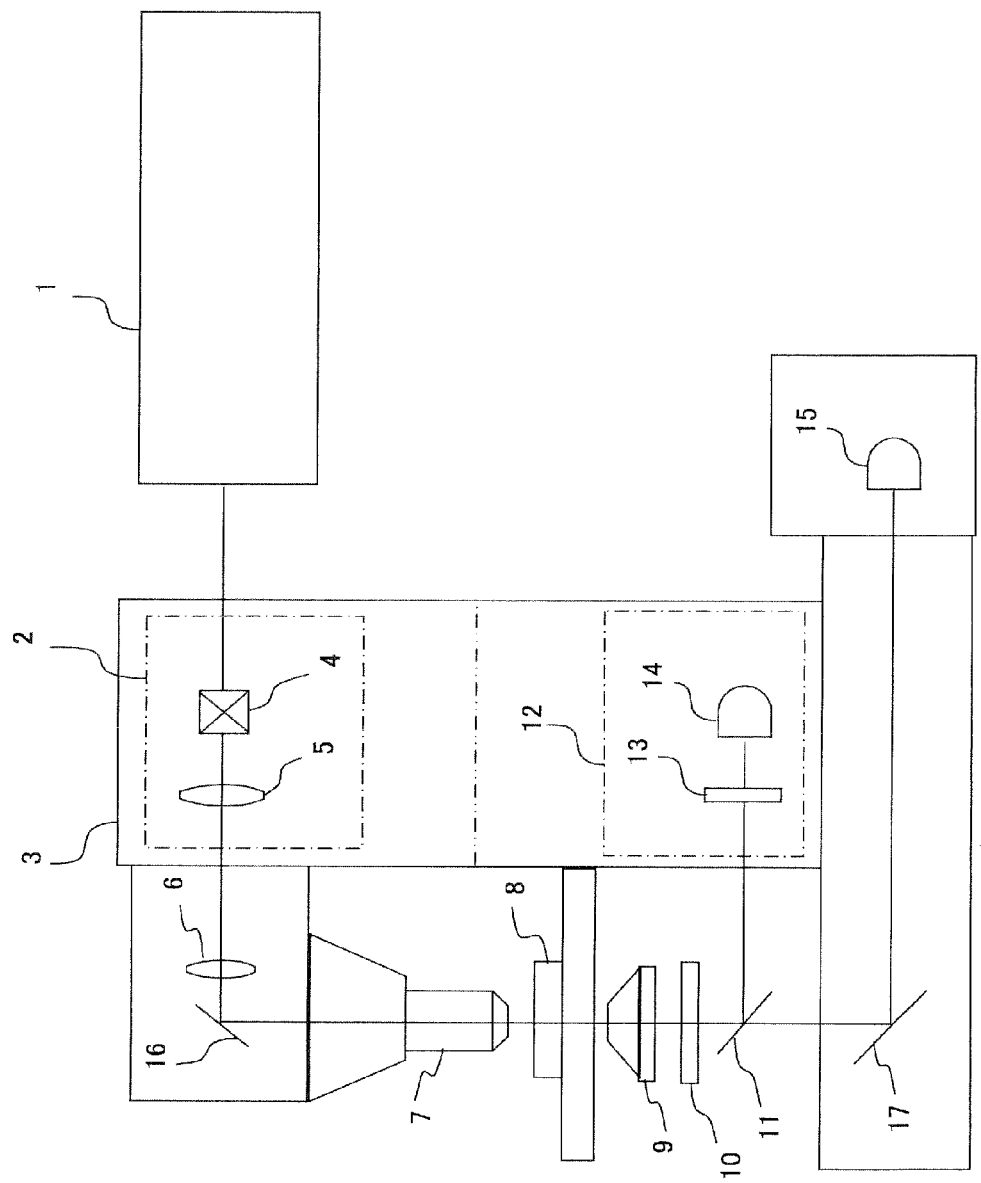
FIG. 1 is a schematic diagram of a multiphoton-excitation laser scanning microscope showing the first embodiment of the present invention.

Hereinafter, embodiments of the present invention are described, referring to the drawings. While the implementation of the present invention is described herein using an example of a multiphoton-excitation laser scanning microscope, the implementation is not limited to the example, and the present invention may also be implemented with an SHG microscope.

Embodiment 1

FIG. 1 is a schematic diagram illustrating an embodiment of a multiphoton-excitation laser scanning microscope according to the present invention. An infrared pulse laser 1 is generally used as the excitation light source in a multiphoton-excitation laser scanning microscope. One reason for using the pulse laser is that the photon density on the focal plane can be effectively increased. Since the infrared pulse laser 1 is a large apparatus, it is disposed outside the microscope, and an infrared light (excitation light) from the infrared pulse laser 1 is directed to the scanning unit 2. The configuration shown in FIG. 1 where the scanning unit 2 is built into the microscope 3 is not a limitation, and the scanning unit 2 may be disposed outside the microscope 3.

The infrared light emitted from the infrared pulse laser 1 is directed to the scan unit 2, and is deflected by scanning means 4 such as a galvano mirror disposed inside the scanning unit 2. Since the scanning means is disposed on a conjugated position with respect to the pupil of an objective lens, the deflected excitation light ultimately scans the surface of a sample 8. After passing through the scanning means 4, the excitation light enters the objective lens 7 via a pupil projection lens 5 and an imaging lens 6. As a result, the sample 8 is irradiated with the infrared light (excitation light).

In the present embodiment, transmission detection is performed for a fluorescence generated by the multiphoton excitation that is a nonlinear phenomenon, (i.e., a result of a nonlinear optical effect). For this purpose, the fluorescence emitted from the sample 8 is collected by a condenser lens 9.

Note that the condenser lens collects not only the fluorescence emitted from the sample 8 but also the infrared light (excitation light) passing through the sample 8.

In the present embodiment, an IR (infrared) partial transmission filter 10 having partially-modified transmission characteristics (to be described later using FIG. 3A and FIG. 3B) is disposed on the front focal position of the condenser lens 9. A dichroic mirror 11 is disposed on a subsequent stage of the IR partial transmission filter 10. A fluorescent detection unit 12 is disposed in one of the light paths separated by the dichroic mirror 11, and an infrared light detector 15 is disposed in the other of the light paths. In this regard, since the fluorescence emitted by the multiphoton excitation has a wavelength that is shorter than that of the excitation light, the arrangement is made so that the light having the shorter wavelength is directed to the fluorescent detection unit 12. The present embodiment illustrates a configuration in which a particularly short wavelength is reflected.

According to the configuration described above, the fluorescence emitted from within the specimen by multiphoton excitation is collected by the condenser lens 9, transmitted through the IR partial transmission filter 10, reflected by the dichroic mirror 11, and directed to the fluorescent detection unit 12.

The fluorescent detection unit 12 is equipped with an infrared light cut filter 13 and a fluorescent detector 14, with which the fluorescent detection unit 12 detects fluorescence with unneeded excitation light being removed. In this regard, the fluorescent detector 14 is preferably a photoelectron multiplier. In addition, instead of disposing a single unit of the fluorescent detector 14, a plurality of the fluorescent detectors 14 may be disposed to perform multi-channel detection. While the fluorescent detection unit 12 is described in FIG. 1 as disposed within the main body of the microscope 3, the present invention is not limited to the arrangement. The light path may be directed in the vertical direction (to plane of paper) in FIG. 1, and the fluorescent detection unit 12 may be disposed outside the microscope.

Meanwhile, after passing through the specimen, the infrared light is collected by the condenser lens 9, passes through the IR partial transmission filter 10, passes through a dichroic mirror 11, and is directed to an infrared light detector 15. In the present embodiment shown in FIG. 1, the infrared light is configured to be directed, by means of the light path that is normally used for the transmitted illumination, to the infrared light detector 15 that is disposed in the lamp housing part. In this regard, the infrared light detector 15 is preferably a photoelectron multiplier.

The infrared light detector 15 is used in observing the figure of the specimen, for the preparation of the specimen including the disposition of a patch clamp and so on. Specifically, the sample 8 is irradiated with a light from the infrared pulse laser 1 with its intensity turned down, and the detection is performed for its transmitted light. At this time, the IR partial transmission filter 10 that is disposed on the front focal position of the condenser lens 9 partially transmits the infrared light. More specifically, only the infrared light that is emitted with an angle with respect to the sample 8 passes through and reaches the dichroic mirror 11. Thus, for the infrared light separated by the dichroic mirror 11 and directed to the infrared light detector 15, the component of an observation light with oblique illumination is detected.

Meanwhile, since the detected light in the multiphoton-excitation observation is in the visible light range and is not subject to the influence of the IR partial transmission filter 10, the multiphoton-excitation observation can be carried out as normal. Thus, according to the configuration described above, switching between the multiphoton-excitation observation and the oblique illumination observation can be performed without shifting the light paths or changing the parts.

In addition, FIG. 1 shows mirrors 16 and 17 for controlling the light path. The light path may also be controlled using a prism.

Embodiment 2

Figure 2:
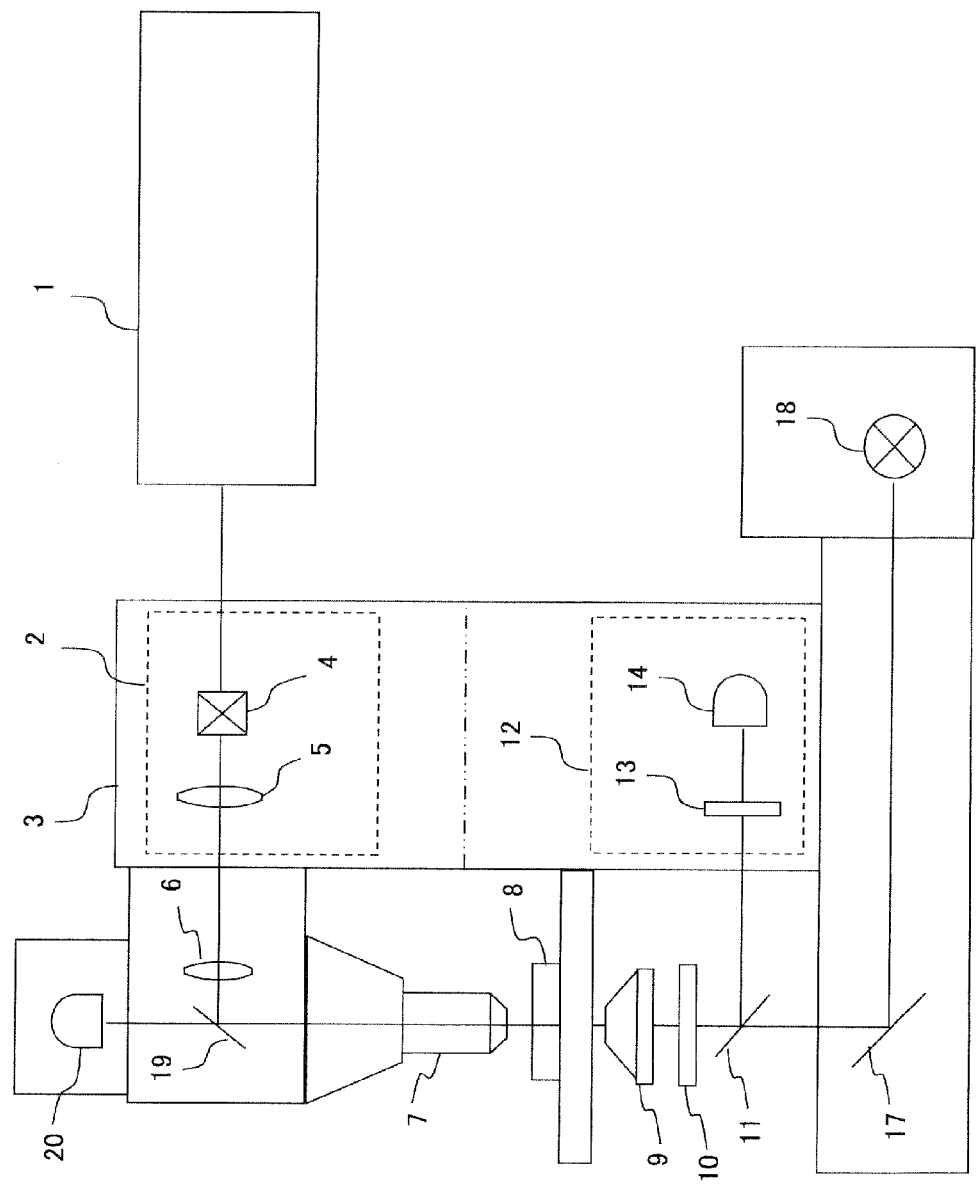
FIG. 2 is a schematic diagram of a multiphoton-excitation laser scanning microscope showing the second embodiment of the present invention.

Hereinafter, the outline of the entire configuration of a multiphoton-excitation laser scanning microscope according to another embodiment is described referring to FIG. 2.

In the same manner as in Embodiment 1, an infrared pulse laser 1 is generally used as the excitation light source. The infrared light emitted from the infrared pulse laser 1 is directed to a scanning unit 2, passes through scanning means 4, a pupil projection lens 5, an imaging lens 6, and the like, and is irradiated on a sample 8 through an objective lens 7. In this regard, in the same manner as in Embodiment 1, the scanning unit 2 may either be built into the microscope 3 or may be disposed outside.

In the present embodiment, to detect the transmitted light as well as in Embodiment 1, the fluorescence from the sample 8 is collected by a condenser lens 9. After passing through the condenser lens 9, the fluorescence is passed through an IR partial transmission filter 10 that is disposed on the front focal position and has partially-modified transmission characteristics (to be described in detail later using FIG. 3A and FIG. 3B), reflected by a dichroic mirror 11, and directed to a fluorescent detection unit 12. While the fluorescent detection unit 12 is described as disposed inside the main body of the microscope 3 as well as in Embodiment 1, the implementation of the present invention not limited to the arrangement.

The fluorescent detection unit 12 is equipped with an infrared light cut filter 13 and a fluorescent detector 14, with which the fluorescent detection unit 12 detects fluorescence with unneeded excitation light being removed. In this regard, the fluorescent detector 14 is preferably a photo electron multiplier. In addition, instead of disposing a single unit of the fluorescent detector 14, a plurality of the fluorescent detectors 14 may be disposed to perform multi-channel detection.

In the present embodiment, a fluorescent light detection unit 12 is disposed in one of the light paths separated by the dichroic mirror 11, and an infrared light source 18 is disposed in the other of the light paths. The light source may be a light source using an infrared radiation, such as a halogen lamp, instead of a pulse laser light source. The example in FIG. 2 shows a configuration in which the infrared light source 18 is disposed in a normal lamp housing position.

The infrared light emitted from the infrared light source 18 passes through the dichroic mirror 11, and its light flux is limited by the IR partial transmission filter 10. Since the IR partial transmission filter 10 is disposed on the front focal position of the condenser lens 9, the infrared light is applied on the sample 8 as oblique illumination after passing through the IR partial transmission filter 10.

The transmitted light from the sample 8 having been applied with the oblique illumination is collected by the objective lens 7, and separated for the excitation path (the light path towards the infrared pulse laser) by a dichroic mirror 19, and imaged by an infrared light imaging device 20 that is an infrared light detector. In this regard, the infrared light imaging device 20 is preferably a two-dimensional imaging device such as an infrared CCD. In other words, an imaging lens not shown in the drawing is disposed between the dichroic mirror 19 and the infrared light imaging device 20, and the sample 8 and the infrared light imaging device 20 are disposed at optically-conjugated positions.

As well as Embodiment 1, the embodiment described above enables switching between the multiphoton-excitation observation and the oblique illumination observation without shifting the light paths or changing parts.

Hereinafter, the embodiments of the IR partial transmission filter used in Embodiments 1 and 2 above are described, in reference to FIG. 3A and FIG. 3B.

Figures 3A, 3B:
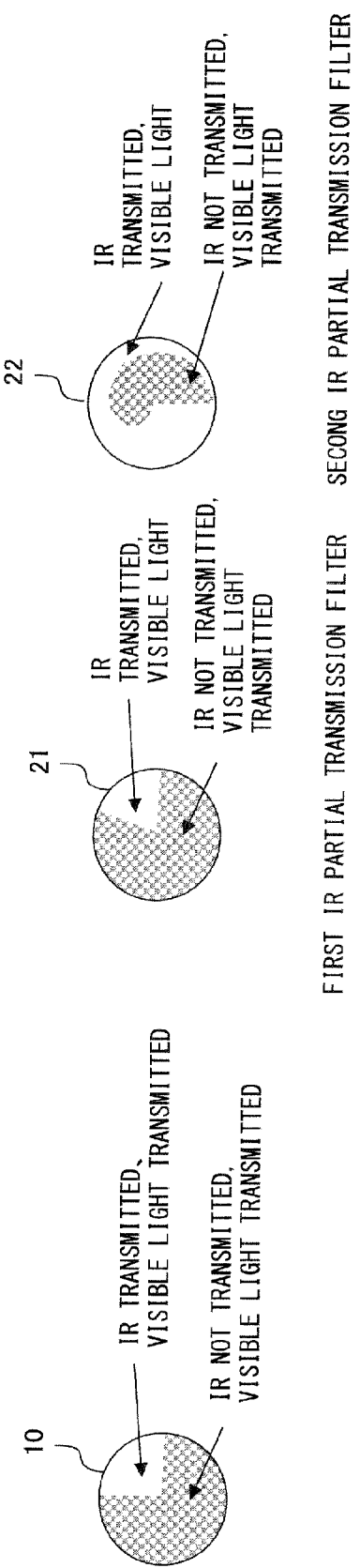
FIG. 3A is a schematic diagram of an IR partial transmission filter used for an embodiment of the present invention.
FIG. 3B is a schematic diagram showing a modified example of an IR partial transmission filter used for an embodiment of the present invention.

FIG. 3A shows an example of an IR partial transmission filter 10 in the simplest form used for the implementation of the present invention. This example shows a configuration in which the obtuse sector-shaped area shown with the checkerboard pattern transmits a visible light but does not transmit an infrared light. Meanwhile, the remaining acute-angled sector-shaped area transmits both the infrared light and the visible light. In other words, the IR partial filter 10 transmits the visible light in the entire area that an effective flux enters. Meanwhile, the infrared light is transmitted only in a partial area in which the effective flux enters, more specifically, in a partial area that is eccentric to the center of the effective flux. The oblique illumination is realized by partially transmitting the infrared light according to the configuration.

FIG. 3B shows another example of the IR partial transmission filter 10 used for the implementation of the present invention. In the example, the IR partial filter is composed by overlapping two IR partial transmission filters, i.e., a first IR partial transmission filter 21 and a second IR partial filter 22. For example, as shown in FIG. 3B, the first IR partial transmission filter 21 is provided with a sector-shaped area that transmits both an infrared light and a visible light. On the other hand, the second IR partial transmission filter 22 is provided with a comma shaped area that transmits the visible light but does not transmit the infrared light. By overlapping the first optical filter and the second optical filter such as the first IR partial filter 21 and the second IR partial filter 22 having different transmission characteristics with respect to the infrared light and by adjusting their angles, the illumination states of the oblique illumination such as the angle and illumination intensity can be adjusted.

Meanwhile, embodiments of the IR partial transmission filter are not limited to the above examples. For example, the area that transmits the infrared light may take various shapes, such as a rectangular shape and an arch shape. It is preferable that the variation of the relative positions of the two IR partial transmission filters is adjusted in accordance with the shape of the area that transmits the infrared light. For example, when the shape of the area that transmits the infrared light is rectangular, it is preferable to change the relative positions by moving the two IR partial transmission filters in parallel, rather than by adjusting the angle of the overlap.

What is claimed is:

1. A laser scanning microscope comprising:
   an infrared light source which emits a first infrared light;
   a condenser lens which is adapted to illuminate a sample with the first infrared light;
   an infrared pulse laser which emits a second infrared light;
   an objective lens which is adapted to irradiate the sample with the second infrared light;
   an infrared light detector which is adapted to detect the first infrared light that passes through the sample and via the objective lens;
   a visible light detector which is adapted to detect via the condenser lens, a visible light that is from the sample, that is caused due to the irradiation of the second infrared light, and that has a wavelength shorter than a wavelength of the second infrared light; and an IR partial transmission filter disposed near a front focal position of the condenser lens, wherein the IR partial transmission filter includes: (i) a first area through which the first infrared light and the visible light are passable, and (ii) a second area through which the visible light is passable but the first infrared light is not passable.

2. The laser scanning microscope according to claim 1, wherein the visible light detector is a photoelectron multiplier, and the infrared light detector is a two-dimensional imaging device.

3. The laser scanning microscope according to claim 1, wherein the second area is positioned eccentric to a center of a light flux of the first infrared light incident to the IR partial transmission filter.

4. The laser scanning microscope according to claim 1, wherein each of the first area and the second area of the IR partial transmission filter is sector-shaped.

5. The laser scanning microscope according to claim 1, wherein the IR partial transmission filter comprises a plurality of IR partial transmission filters disposed near the front focal position of the condenser lens, wherein each of the plurality of IR partial transmission filters is positioned independently with respect to a light flux of the incident first infrared light.

6. The laser scanning microscope according to claim 1, further comprising:
a first light path separating element which is disposed between the infrared light source and the condenser lens, wherein the first light path separating element reflects one of infrared light and the visible light and transmits the other of the infrared light and the visible light.

7. The laser scanning microscope according to claim 6, further comprising:
a second light path separating element which is disposed between the infrared pulse laser and the objective lens, wherein the second light path separating element reflects one of the second infrared light and the first infrared light and transmits the other of the second infrared light and the first infrared light; and
a scanning unit which is disposed between the infrared pulse laser and the second light path separating element, wherein the scanning unit is adapted to scan the sample with the second infrared light.

8. The laser scanning microscope according to claim 1, wherein the IR partial transmission filter is disposed between the condenser lens and the infrared light source, and between the condenser lens and the visible light detector.

* * * * *